United States Patent
Bauman

(10) Patent No.: US 7,546,138 B2
(45) Date of Patent: Jun. 9, 2009

(54) COMMUNICATION SYSTEM AND METHOD WITH GAIN CONTROL FOR SIGNALS FROM DISTRIBUTED ANTENNAS

(75) Inventor: Donald R. Bauman, Waseca, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 48 days.

(21) Appl. No.: 11/624,541

(22) Filed: Jan. 18, 2007

(65) Prior Publication Data

US 2007/0117592 A1 May 24, 2007

Related U.S. Application Data

(63) Continuation of application No. 10/308,854, filed on Dec. 3, 2002, now Pat. No. 7,171,244.

(51) Int. Cl.
*H04B 7/00* (2006.01)
*H04M 1/00* (2006.01)
*H04Q 7/20* (2006.01)

(52) U.S. Cl. .................. 455/524; 455/562.1; 455/426.1

(58) Field of Classification Search ............. 455/426.1, 455/426.2, 562.1, 525, 524, 561, 560, 7, 455/11.1, 16
See application file for complete search history.

(56) References Cited

U.S. PATENT DOCUMENTS

| | | | |
|---|---|---|---|
| 4,144,411 A | * | 3/1979 | Frenkiel ..................... 455/447 |
| 4,183,054 A | | 1/1980 | Patisaul et al. |
| 4,451,699 A | | 5/1984 | Gruenberg |
| 4,475,010 A | | 10/1984 | Huensch et al. |
| 4,485,486 A | | 11/1984 | Webb et al. |
| 4,556,760 A | | 12/1985 | Goldman |
| 4,611,323 A | | 9/1986 | Hessenmüller |
| 4,628,501 A | | 12/1986 | Loscoe |
| 4,654,843 A | | 3/1987 | Roza et al. |
| 4,691,292 A | | 9/1987 | Rothweiler |
| 4,849,963 A | | 7/1989 | Kawano et al. |
| 4,916,460 A | | 4/1990 | Powell |

(Continued)

FOREIGN PATENT DOCUMENTS

EP 0346925 A2 12/1989

(Continued)

OTHER PUBLICATIONS

Wala, 1993 43rd IEEE Vehicular Technology Conference, May 18-20, 1993, Personal Communication—Freedom Through Wireless Technology, Waseca Technology Inc., published May 18, 1993, "A New Microcell Architecture Using Digital Optical Transport," pp. 585-588.

(Continued)

*Primary Examiner*—Tilahun B Gesesse
(74) *Attorney, Agent, or Firm*—Fogg & Powers LLC

(57) ABSTRACT

An apparatus for gain control in a communication system is disclosed. The apparatus includes means for receiving at least one aggregate communications signal, the at least one aggregate communications signal comprising a summation of distributed communications signals, means for detecting at least a sample of a signal level of the at least one aggregate communications signal, and means for attenuating the signal level of the at least one aggregate communications signal based on the signal level sample.

26 Claims, 9 Drawing Sheets

U.S. PATENT DOCUMENTS

| | | | |
|---|---|---|---|
| 4,999,831 | A | 3/1991 | Grace |
| 5,067,173 | A | 11/1991 | Gordon et al. |
| 5,278,690 | A | 1/1994 | Vella-Coleiro |
| 5,321,849 | A | 6/1994 | Lemson |
| 5,621,786 | A | 4/1997 | Fischer et al. |
| 5,627,879 | A | 5/1997 | Russell et al. |
| 5,642,405 | A | 6/1997 | Fischer et al. |
| 5,644,622 | A * | 7/1997 | Russell et al. ............ 455/422.1 |
| 5,657,374 | A | 8/1997 | Russell et al. |
| 5,765,099 | A * | 6/1998 | Georges et al. ............... 455/14 |
| 5,774,789 | A | 6/1998 | Van der Kaay et al. |
| 5,802,173 | A | 9/1998 | Hamilton-Piercy et al. |
| 5,809,395 | A | 9/1998 | Hamilton-Piercy et al. |
| 5,852,651 | A | 12/1998 | Fischer et al. |
| 5,878,325 | A * | 3/1999 | Dail ........................ 725/125 |
| 5,969,837 | A | 10/1999 | Farber et al. |
| 6,112,086 | A | 8/2000 | Wala |
| 6,122,529 | A | 9/2000 | Sabat, Jr. et al. |
| 6,150,993 | A | 11/2000 | Dobrovolny |
| 6,223,021 | B1 * | 4/2001 | Silvia et al. ................... 455/77 |
| 6,259,910 | B1 | 7/2001 | Fairfield et al. |
| 6,298,246 | B1 | 10/2001 | Lysejko et al. |
| 6,336,042 | B1 | 1/2002 | Dawson et al. |
| 6,349,200 | B1 * | 2/2002 | Sabat et al. ................. 455/403 |
| 6,374,124 | B1 | 4/2002 | Slabinski |
| 6,480,702 | B1 * | 11/2002 | Sabat, Jr. ................. 455/115.3 |
| 6,801,767 | B1 | 10/2004 | Schwartz et al. |
| 6,807,374 | B1 | 10/2004 | Imajo et al. |
| 7,103,377 | B2 * | 9/2006 | Bauman et al. ............. 455/522 |

FOREIGN PATENT DOCUMENTS

| | | |
|---|---|---|
| EP | 0468688 A2 | 1/1992 |
| WO | 9115927 | 10/1991 |

OTHER PUBLICATIONS

ADC Kentrox, News Release, "ADC Kentrox Introduces Innovative Wireless Network Access Solution Cellular Subscribers Offered a New Level of Portable Services," Mar. 1, 1993 (3 pages).

"And now a few words from your Customers . . . " Four pages. ADC Kentrox.COPYRGT. A Subsidiary of ADC Telecommunications, Inc. Aug. 1992.

Tang, Fiber Optic Antenna Remoting for Multi-Sector Cellular Cell Sites. GTE Laboratories—Abstract (Conference Jun. 14-18, 1992).

Akos et al., Jul. 1999, IEEE Transactions on Communications, 47:983-988, "Direct Bandpass Sampling of Multiple Distinct RF Signals."

Merrett et al., 41st IEEE Vehicular Technology Conference, May 19-22, 1991, Gateway to the Future Technology, 91CH2944-7, Britich Telecom Research Laboratories, "A Cordless Access System Using Radio-Over-Fibre Techniques," pp. 921-924.

R. Steele. Towards a High-Capacity Digital Cellular Mobile Radio System. "Towards a High Capacity Digital Cellular Mobile Radio System," IEE Proceedings, vol. 132, Pt.F, No. 5, Aug. 1985, pp. 405-415.

ADC Kentrox, News Release, "First Field Trial Results Exceeds Expectations," Mar. 2, 1993 (2 pages).

1998 Foxcom Wireless Proprietary Information, pp. 1-8, "Litenna In-Building RF Distribution System."

Microwaves & Rf, "Digital Transport for Cellular," Feb. 1993.

Kobb, "Personal Wireless," Special Report/Communications, IEEE Spectrum, Jun. 1993, pp. 20-25.

Russell, New Microcell Technology Sets Cellular Carriers Free, Telephony, Mar. 1993, pp. 40, 42 and 46.

"ADC Kentrox Introduces CityCell 824, A Replacement For Conventional Cell Sites; Company's Original Goal Was To Improve Fiber Optic T1 Links Between Cells, MTSOs," Telocator Bulletin, Feb. 1993 (1 page).

Urban Microcell System Layout. GTE Laboratories (Conference Jun. 14-18, 1992).

Lee et al., 1993 43rd IEEE Vehicular Technology Conferencec, May 18-20, 1993, Personal Communication—Freedom Through Wireless Technology, PacTel Corporation, published May 18, 1993, "Intelligent Microcell Applications in PCS," pp. 722-725.

ADC Kentrox Wireless System Group CityCell.TM. 824—A Positioning white paper, (Mar. 1993) CITA Trade Show.

ZoneMaster.TM.—Maximum Coverage For High-Capacity Locations. Decibel Multi Media MicroCell System. 4 pages. 1993 Decibel Products. 2-83-5M.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

* cited by examiner

US 7,546,138 B2

COMMUNICATION SYSTEM AND METHOD WITH GAIN CONTROL FOR SIGNALS FROM DISTRIBUTED ANTENNAS

CROSS REFERENCE TO APPLICATION

This application is a continuation of U.S. patent application Ser. No. 10/308,854, filed on Dec. 3, 2002 and entitled "COMMUNICATION SYSTEM AND METHOD WITH GAIN CONTROL FOR SIGNALS FROM DISTRIBUTED ANTENNAS" (the '854 Application). The '854 Application is incorporated herein by reference.

BACKGROUND

Various types of wireless communication systems are prevalent around the world. For example, cellular communication systems cover most major metropolitan areas as well as major highways through remote areas. Cellular systems permit individuals with cellular handsets to communicate with base stations that are connected to the public switched telephone network (PSTN) or some other communication network.

As with any communication system, cellular systems can leave coverage "holes" where the signal from the base stations cannot reach. The holes can be in tunnels, valleys, city streets between tall buildings, or any other location where a radio frequency (RF) signal is blocked. Placing additional base stations where these coverage holes are located is not always an option. Base stations tend to be very expensive due not only to the cost of the equipment but also because of land acquisition costs. Additionally, large base station antennas may not fit within an area either physically or aesthetically. A particular solution to hole coverage is to use smaller distributed antennas where coverage is needed but a base station is not warranted or desired.

Any system has a certain dynamic range over which signals are processed. For a system that has only one antenna port, the entire dynamic range is available to the single port signal. When the system has multiple antenna ports, as in the distributed antenna system, the same dynamic range is shared amongst the aggregate signal from all the ports. This reduces the dynamic range available for each port when multiple ports are simultaneously active.

SUMMARY

The following specification addresses a communication system and method with gain control for signals from distributed antennas. Particularly, in one embodiment, an apparatus for gain control in a communication system is provided. The apparatus includes means for receiving at least one aggregate communications signal, the at least one aggregate communications signal comprising a summation of distributed communications signals, means for detecting at least a sample of a signal level of the at least one aggregate communications signal, and means for attenuating the signal level of the at least one aggregate communications signal based on the signal level sample.

DETAILED DESCRIPTION

By distributing signal attenuation and control of the attenuation, the embodiments of the present invention retain the original system dynamic range. By doing so, no additional bits are needed to represent the aggregate signal from the distributed antennas.

The embodiments of the present invention refer to fiber optics as a communications medium between remote units and the host unit. However, the communications medium connecting the remote units to the host unit call take any form including a laser through an air interface, an RF signal over coaxial cable, or an RF signal through an air interface.

Figure 1:
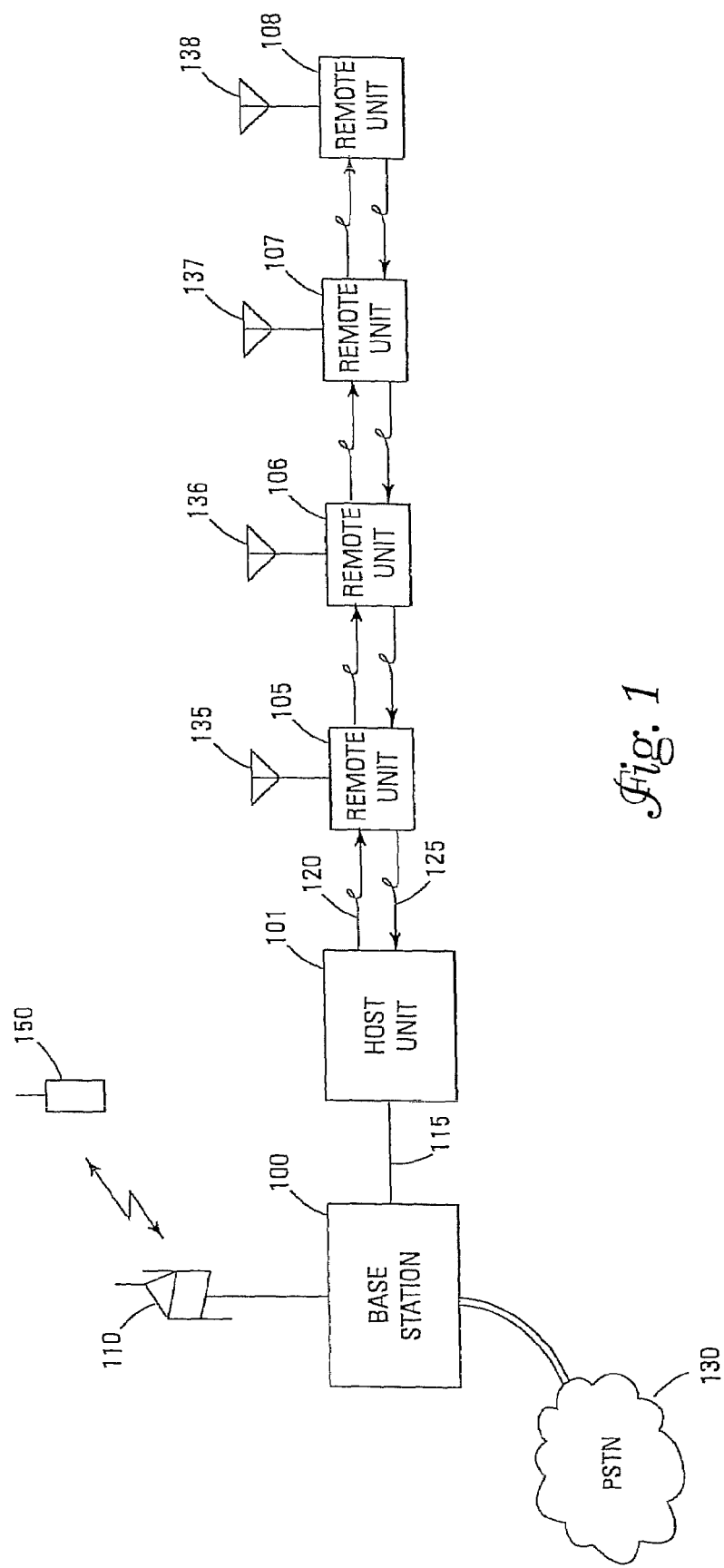
FIG. 1 shows a block diagram of one embodiment of a distributed digital antenna system of the present invention.

FIG. 1 illustrates a block diagram of one embodiment of a distributed digital antenna system of the present invention. The system has a base station (100) that communicates over an RF link using all antenna (110). The base station communicates over the RF link using any appropriate air interface standard. For example, the air interface standard comprises one of Advanced Mobile Phone System (AMPS), code division multiple access (CDMA), time division multiple access (TDMA) Global System for Mobile communications (GSM), or any other appropriate air interface standard.

The RF link is made up of a forward link over which the base station (100) transmits to a subscriber unit (150). The subscriber unit (150) transmits back to the base station (100) over a reverse link. The subscriber unit (150) is either a mobile station or a fixed station such as in a wireless local loop system.

The base station (100) has the transmitters and receivers that enable the subscriber unit (150) to communicate with the public switched telephone network (PSTN) (130). In one embodiment, the base station links the subscriber unit (150) to other subscriber units that are communicating with other base stations. In one embodiment, the base station (100) is connected to the PSTN through a mobile switching center that handles the switching of calls with multiple base stations.

A host unit (101) is connected to the base station (100) through an RF link (115). In one embodiment, this link (115) is a coaxial cable. Other embodiments use other types of connections such as all air interface or an optical fiber carrying digital RF signals. U.S. Pat. No. 6,704,545, assigned to ADC Telecommunications, Inc. and incorporated herein by reference, discloses digital RF signals.

The host unit (101) is responsible for converting the RF signal from the base station (100) to an optical signal for transmission over an optical medium. The host unit (101) also converts a received optical signal to an RF signal for transmission to the base station (100). In other embodiments, the host unit (101) performs additional functions.

One or more remote units (105-108) are connected to the host unit (101) through an optical medium, such as fiber optic lines (120 and 125), in a daisy-chain arrangement. The remote units (105-108) are placed in locations that require additional signal coverage due to a lack of coverage by the base station (100). The remote units (105-108) communicate with subscriber units in a particular remote unit's coverage area over an RF link provided by the remote unit antennas (135-138).

For purposes of illustration, four remote units (105-108) are shown. However, alternate embodiments use other quantities of remote units. If only a small geographic area requires coverage, as few as one remote unit (105) is used. If a highway in a remote area requires additional coverage, more than four remote units are typically used.

The embodiment of FIG. 1 uses a separate fiber optic line for each direction of communication. Each fiber carries a different wavelength. For example, the fiber optic line (120) from the host unit (101) to the remote units (105-108) carries a wavelength of $\lambda_1$. The fiber optic line (125) from the remote units (105-108) to the host unit (101) carries a wavelength of $\lambda_2$. In alternate embodiments, each fiber carries the same wavelength.

The fiber optic line (120) from the host unit (101) to the remote units (105-108) carries the digital optical signal for transmission by the remote units (105-108). The fiber optic line (125) from the remote units (105-108) carries a digital optical signal comprising the sum of the received signals from each of the remote units (105-108). The generation of this summation signal from the remote units is discussed subsequently.

Figure 2:
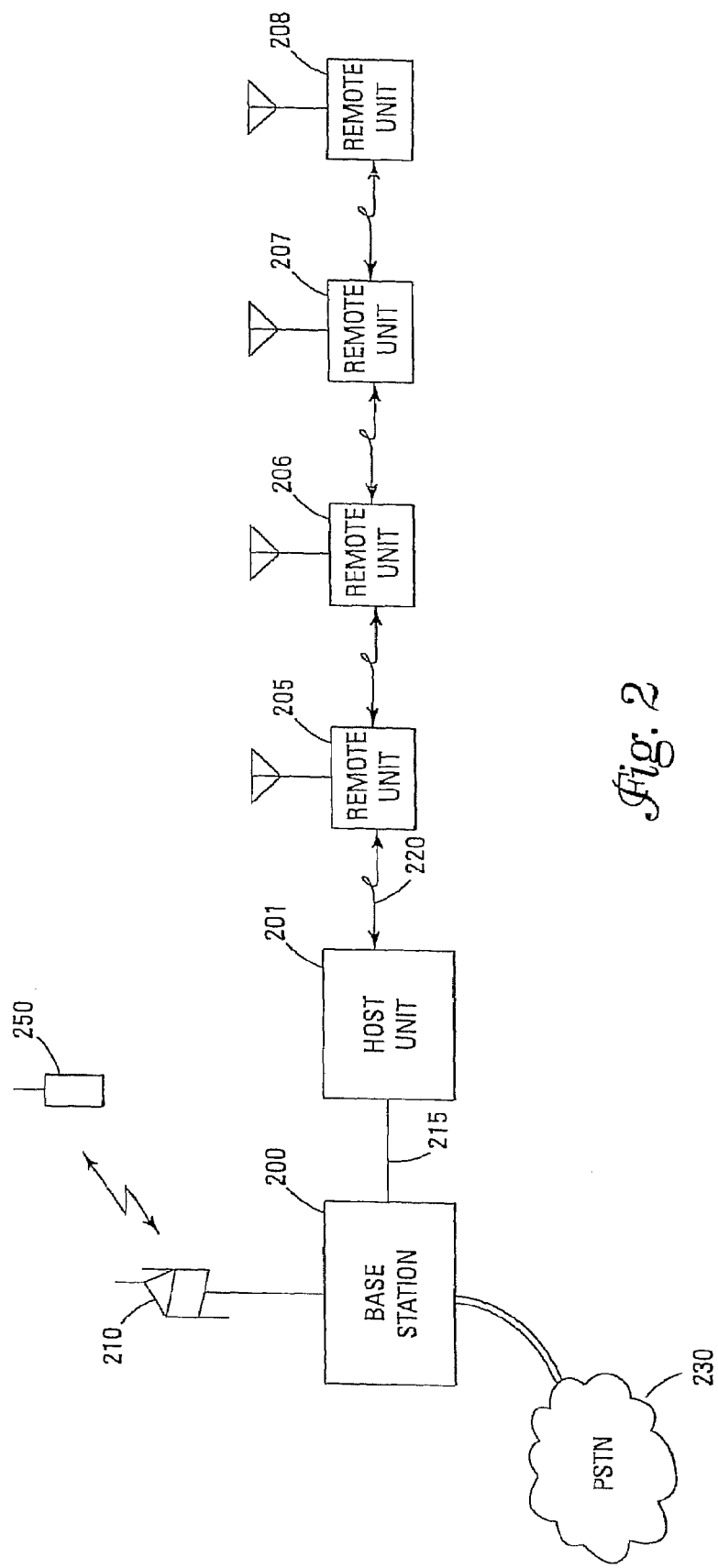
FIG. 2 shows a block diagram of another embodiment of a distributed digital antenna system of the present invention.

FIG. 2 illustrates a block diagram of another embodiment of a distributed digital antenna system of the present invention. This system is similar to the embodiment of FIG. 1 except that the remote units (205-208) are connected to the host unit (201) over a single optical medium (220).

The system of FIG. 2 has a base station (200) that communicates over an RF link using an antenna (210). The base station can communicate over the RF link using any air interface standard. For example, the air interface standard may be code division multiple access (CDMA), time division multiple access (TDMA), or Global System for Mobile communications (GSM).

The RF link is made up of a forward link over which the base station (200) transmits to a subscriber unit (250). The subscriber unit (250) transmits back to the base station (200) over a reverse link. The subscriber unit (250) may be a mobile station or a fixed station such as in a wireless local loop system.

The base station (200) has the transmitters and receivers that enable the subscriber unit (250) to communicate with the public switched telephone network (PSTN) (230). The base station may also link the subscriber unit (250) to other subscriber units that are communicating with other base stations. In one embodiment, the base station (200) is connected to the PSTN through a mobile switching center that handles the switching of calls with multiple base stations.

A host unit (201) is connected to the base station (200) through an RF link (215). In one embodiment, this link (215) is a coaxial cable. Other embodiments use other types of connections such as an air interface or an optical fiber carrying digital RF signals.

The host unit (201) is responsible for converting the RF signal from the base station (200) to a digital optical signal for transmission over an optical medium. The host unit (201) also converts a received optical signal to an RF signal for transmission to the base station (200). In other embodiments, the host unit (201) performs additional functions.

One or more remote units (205-208) are connected to the host unit (201) through an optical medium, such as a fiber optic line (220), that is connected in a daisy-chain arrangement. The remote units (205-208) are placed in locations that require additional signal coverage due to a lack of coverage by the base station (200).

For purposes of illustration, four remote units (205-208) are shown. However, alternate embodiments use other quantities of remote units depending on the application.

The embodiment of FIG. 2 uses a single fiber optic line (220) for communication both to and from the remote units (205-208). This is accomplished by the single fiber (220) carrying multiple wavelengths. For example, the fiber optic line (220) uses a wavelength of $\lambda_1$ for the digital signal from the host unit to the remote units (205-208). The fiber optic line (220) also carries a digital summation signal with a wavelength of $\lambda_2$. This digital summation signal is the sun of the received signals from the remote units (205-208). The generation of this summation signal from the remote units is discussed subsequently.

Figure 3:
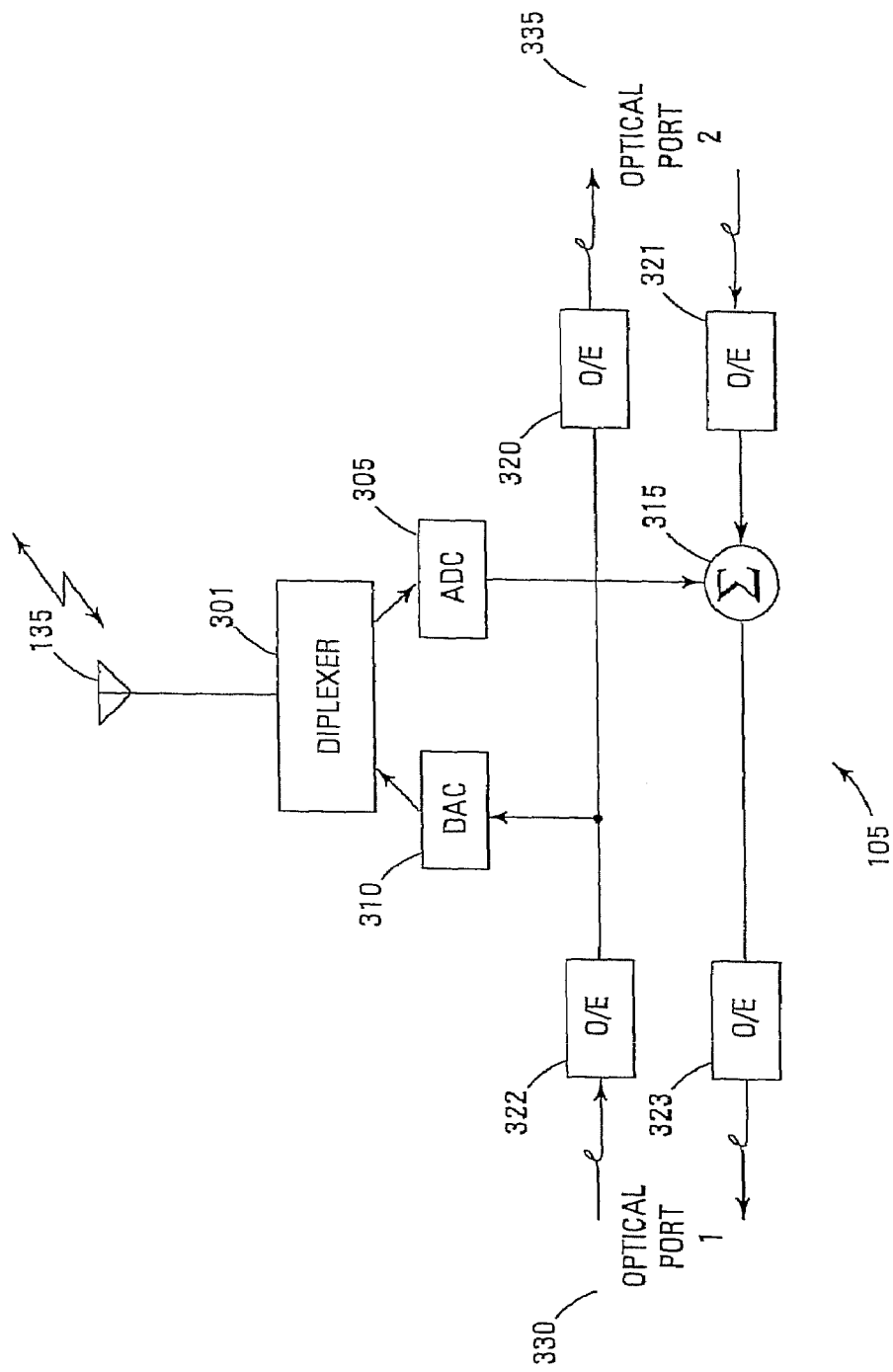
FIG. 3 shows a block diagram of one embodiment of a remote unit in accordance with the system of FIG. 1.

FIG. 3 illustrates a block diagram of one embodiment of a remote unit (105) of FIG. 1. Each of the remote units (105-108) of the embodiment of FIG. 1 are substantially identical in functional composition.

The remote unit (105) transmits and receives RF communication signals over the antenna (135). Both the receive and transmit circuitry is connected to the antenna (135) through a diplexer (301). Alternate embodiments use other quantities of antennas. For example, one embodiment uses three antennas to cover three different sectors of an area.

An analog signal that is received on the antenna (135) is split off by the diplexer (301) to an analog-to-digital converter (305). The analog-to-digital converter (305) digitizes the received analog signal by periodically sampling the signal. The sampling generates a digital representation of the received analog signal.

The digitized received signal is input to a summer (315) to be added to the digitized signals from the preceding remote units in the daisy-chain. The input of the summer (315), therefore, is coupled to an output of a previous remote unit. The output of the summer (315) is a summation signal that is coupled to either the input of a subsequent remote unit or to the host unit. The host unit thus receives a summation signal that represents the sum of all the signals received by the remote units (105-108) of the system.

A digital signal from the host unit is coupled to a digital-to-analog converter (310). The digital-to-analog converter (310) takes the digital representation of an analog signal and converts it to the analog signal for transmission by the antenna (135).

Optical-to-Electrical converters (320-323) are located at the optical ports (330 and 335) of the remote unit (105). Each optical port (330 and 335) has an input and an output that are each coupled to an Optical-to-Electrical converter (320-323).

Since the remote unit (105) operates with electrical signals that are represented by the optical signals coming in through the optical ports (330 and 335), the Optical-to-Electrical converters (320-323) are responsible for converting the optical signals to electrical signals for processing by the remote unit (105). Received electrical signals are converted from electrical to an optical representation for transmission over the optical fiber.

Figure 4:
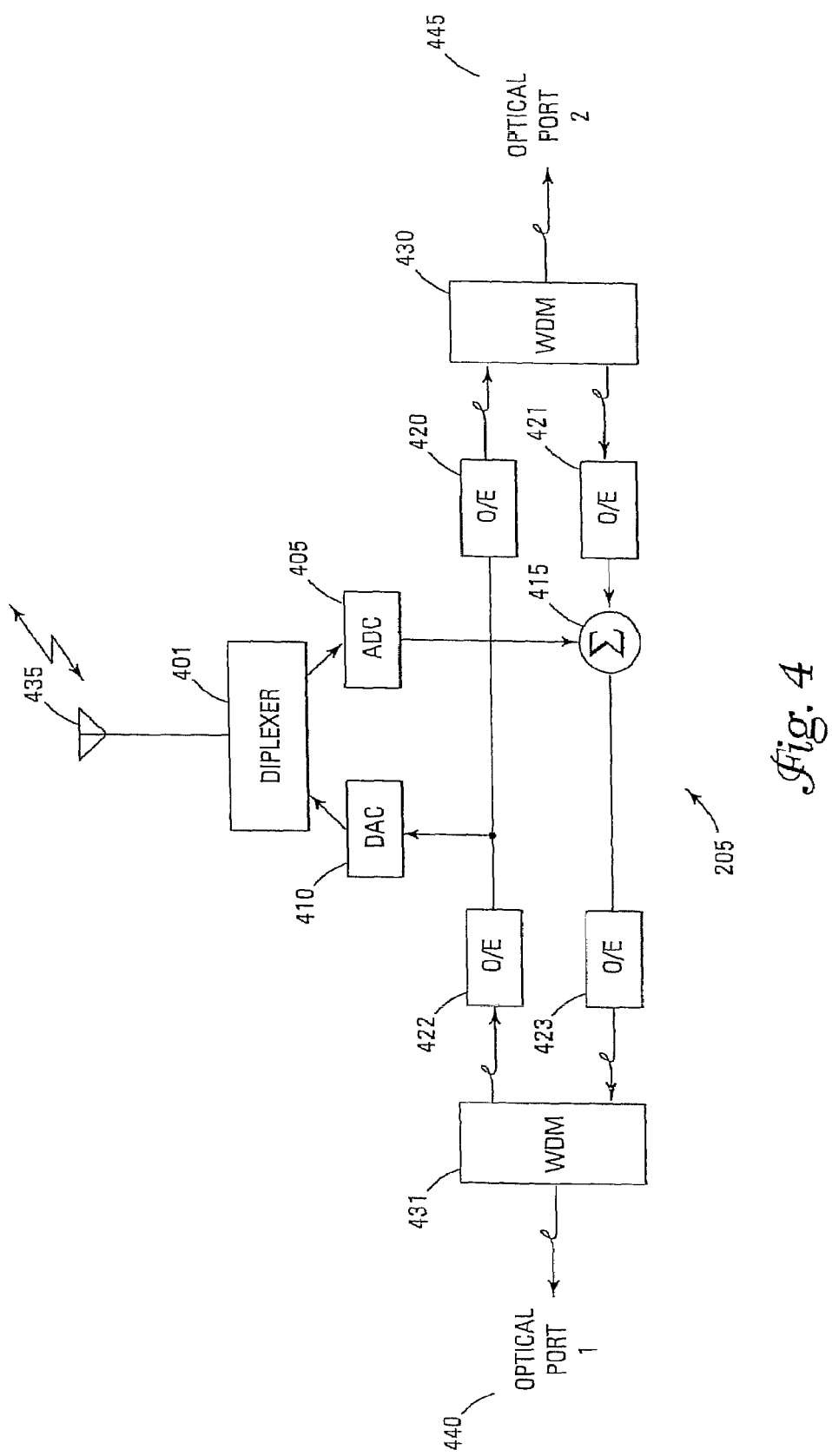
FIG. 4 shows a block diagram of one embodiment of a remote unit in accordance with the system of FIG. 2.

FIG. 4 illustrates a block diagram of one embodiment of a remote unit (205) of FIG. 2. Each of the remote units (205-208) of the embodiment of FIG. 1 is substantially identical in functional composition.

The remote unlit (205) transmits and receives RF communication signals over the antenna (435). Both the receive and transmit circuitry are connected to the antenna (435) through a diplexer (401). Alternate embodiments use other quantities of antennas. For example, one embodiment uses three antennas to cover three different sectors of an area.

An analog signal that is received on the antenna (435) is split off by the diplexer (401) to an analog-to-digital converter (405). The analog-to-digital converter (405) digitizes the received analog signal by periodically sampling the signal. The sampling generates a digital representation of the received analog signal.

The digitized received signal is input to a summer (415) to be added to the digitized signals from the preceding remote units in the daisy-chain. The host unit thus receives a summation signal that represents the sum of all the signals received by the remote units (205-208) of the system.

A digital signal from the host unit is coupled to a digital-to-analog converter (410). The digital-to-analog converter (410) takes the digital representation of an analog signal and converts it to the analog signal for transmission by the antenna (435).

Optical-to-Electrical converters (420-423) are located at the optical ports (440 and 445) of the remote unit (205). Each optical port (440 and 445) has all input and an output that are each coupled to an Optical-to-Electrical converter (420-423).

Since the remote unit (205) operates with electrical signals that are represented by the optical signals coming in through the optical ports (440 and 435), the Optical-to-Electrical converters (420-423) are responsible for converting the optical signals to electrical signals for processing by the remote unit (205). Received electrical signals are converted from electrical to an optical representation for transmission over the optical fiber.

A wavelength division multiplexer (WDM) (430 and 431) is located at each optical port (440 and 445). The WDMs (430 and 431) perform the optical multiplexing necessary to combine several optical signals having several wavelengths. The WDMs (430 and 431) also perform the optical demultiplexing necessary to split the multiple wavelengths of a single fiber to their own signal paths.

In the above-described embodiments, if one antenna port uses up all of the system's dynamic range, none is available for the other antenna ports and the aggregate dynamic range needs to be increased. The amount of additional dynamic range required (in dB) is expressed as $6*Log_2 N$, where N is the number of antenna ports. The quantity of additional bits required in a frame in order to express the aggregate signal is expressed as $Log_2 N$.

As an example of one embodiment of operation, the dynamic range for one antenna port is 14 bits at 84 dB. To accommodate the aggregate dynamic range for 32 antenna ports, an additional 30 dB and 5 bits are required. In this case, the analog-to-digital resolution for each port still remains at 14 bits but the summation of all the antenna port signals is represented by 19 bits.

In order to keep the original dynamic range and output signal levels, the distributed attenuation of the embodiments of the present invention use attenuators at antenna port inputs, outputs, or both. The distributed control may use a head-end based controller with feedback to each antenna port, local controllers at each antenna port, or distributed control with distributed feedback.

The various embodiments of the present invention use automatic gain limiting (AGL) as a gain control function. Alternate embodiments use automatic gain control (AGC) as a gain control function. AGL is active only when the signal exceeds some maximum value. AGC continuously controls attenuation.

The embodiments of the present invention employ different methods of attenuation. These methods include continuous attenuation and stepped attenuation.

Continuous attenuation is continuous in value. The value specifies exactly as much attenuation as is needed. In other words, the attenuation could be proportional to the excess sampled signal level above a maximum threshold. If the aggregate signal is 2.3 dB above the maximum threshold, the attenuator introduces exactly 2.3 dB of attenuation.

This method of attenuation is accomplished by multiplying the aggregate value by the appropriate attenuation factor. In one embodiment, the attenuation factor is between 0, for infinite attenuation, and 1 for no attenuation. Other embodiments may use other number ranges to represent the attenuation factor.

Stepped attenuation uses a limited set of numbers to provide attenuation in discrete increments. The set of numbers represents a corresponding set of attenuation factors. In one embodiment, the numbers 0 through 5 represents attenuation factors from 0 to 30 dB in 6 dB increments. Other embodiments may use other numbers to represent other ranges. Above a maximum threshold, 6 dB of attenuation is applied. Every additional 6 dB above the threshold another 6 dB of attenuation is applied.

The 6 dB increments can be accomplished in a binary number by bit shifting in the direction of a smaller value. One shift equals 6 dB, two shifts equals 12 dB, and three shifts equals 18 dB. This call be continued for as much attenuation as required. For 32 antenna ports, five shifts of 6 dB accommodate 30 dB of attenuation.

The embodiments of the present invention use automatic gain limiting based on various methods of sensing levels and applying attenuation. These methods include gain limiting based on the sensing of input signal levels, the sensing of common output signal levels, the sensing of feedback signal levels, or various combinations of these. In addition, these methods include applying attenuation to the input signals, to the common (aggregate) output signals, or both.

The following embodiments discuss certain transport path and aggregate signal levels (e.g., 14 bits). This is for illustration purposes only. The present invention is not limited to any one transport path size or aggregate signal level.

Figure 5:
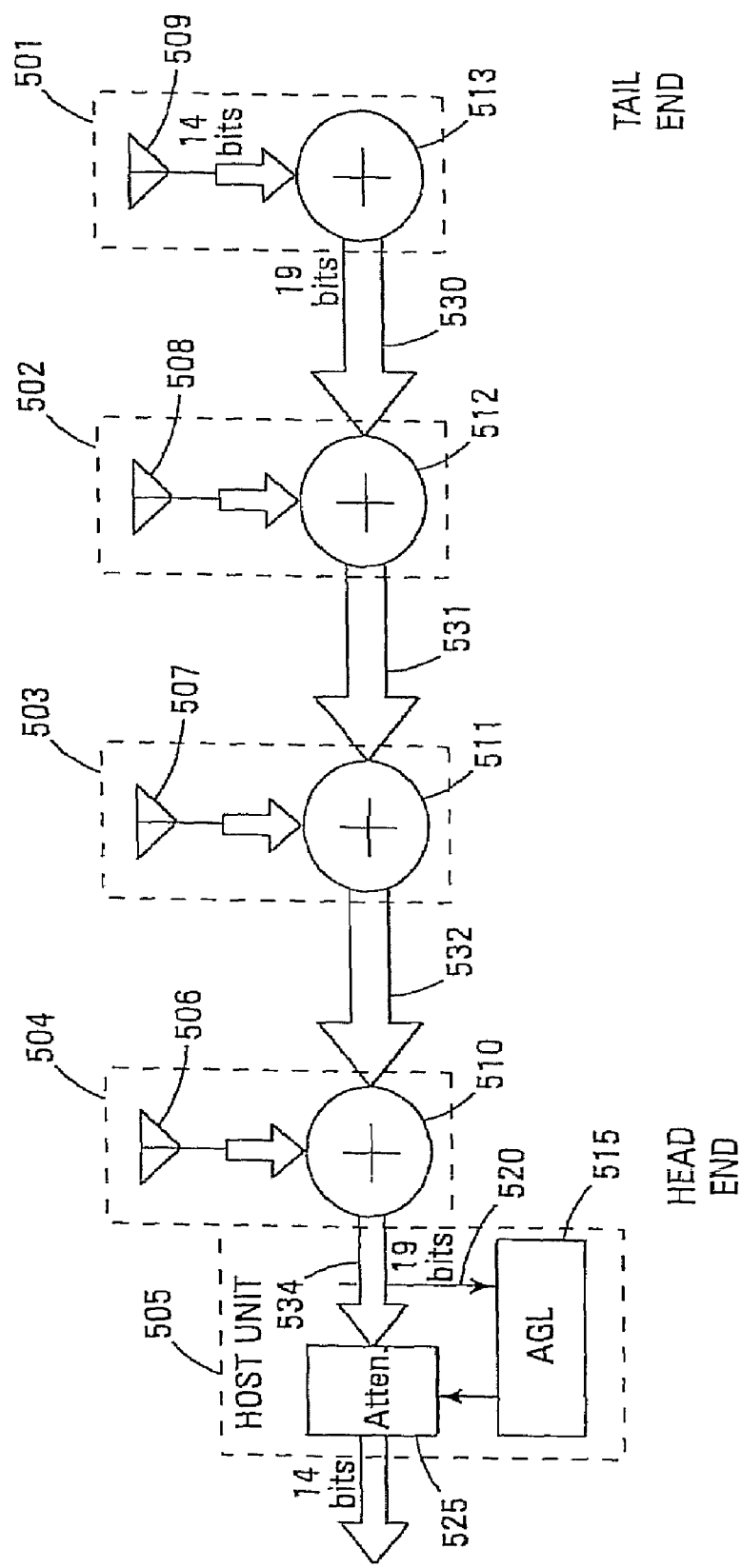
FIG. 5 shows a block diagram of one embodiment of a system having distributed summation and gain control with head end common aggregate attenuation.

FIG. 5 illustrates a block diagram of one embodiment of a system having distributed summation and gain control with head end common attenuation. For purposes of clarity, a functional equivalent of the above-described remote unit, in this and subsequent embodiments, is illustrated as an antenna (509) with a summation symbol (513).

The embodiment of FIG. 5 includes the four remote units (501-504) and the host unit (505) as described previously. Each remote unit (501-504) has an antenna (506-509) that receives RF signals that are digitized and summed (510-513) with any previous remote unit signals.

The summations (510-513) and transport path (530-532) to each remote unit should have sufficient dynamic range to deliver the aggregate dynamic range. For example, in one embodiment the full dynamic range is 19 bits for 32 antenna ports. This embodiment assumes that all of the remote units are substantially identical.

In the embodiment of FIG. 5, the host unit (505), located at the head end, performs the AGL (515) and attenuation (525)

functions. The AGL function (515) samples (520) the aggregate signal (534) from the last remote unit (504) before the host unit (505). This signal requires 19 bits for a dynamic range of 114 dB. Other embodiments have other bit quantities to represent other dynamic ranges.

If the AGL function (515) determines that the aggregate signal (531) is greater than the maximum allowable dynamic range, the AGL function (515) instructs the attenuation function (525) to attenuate the common signal. The attenuation function (525) may be stepped or continuous. The AGL function is based on sensing the common output signal level and attenuating the common output signal level.

In the example illustrated in FIG. 5 where the aggregate signal is 19 bits, the attenuation function attenuates the signal to 14 bits. Thus, the signal from the host unit (505) to a base station will be within the allowable dynamic range.

Figure 6:
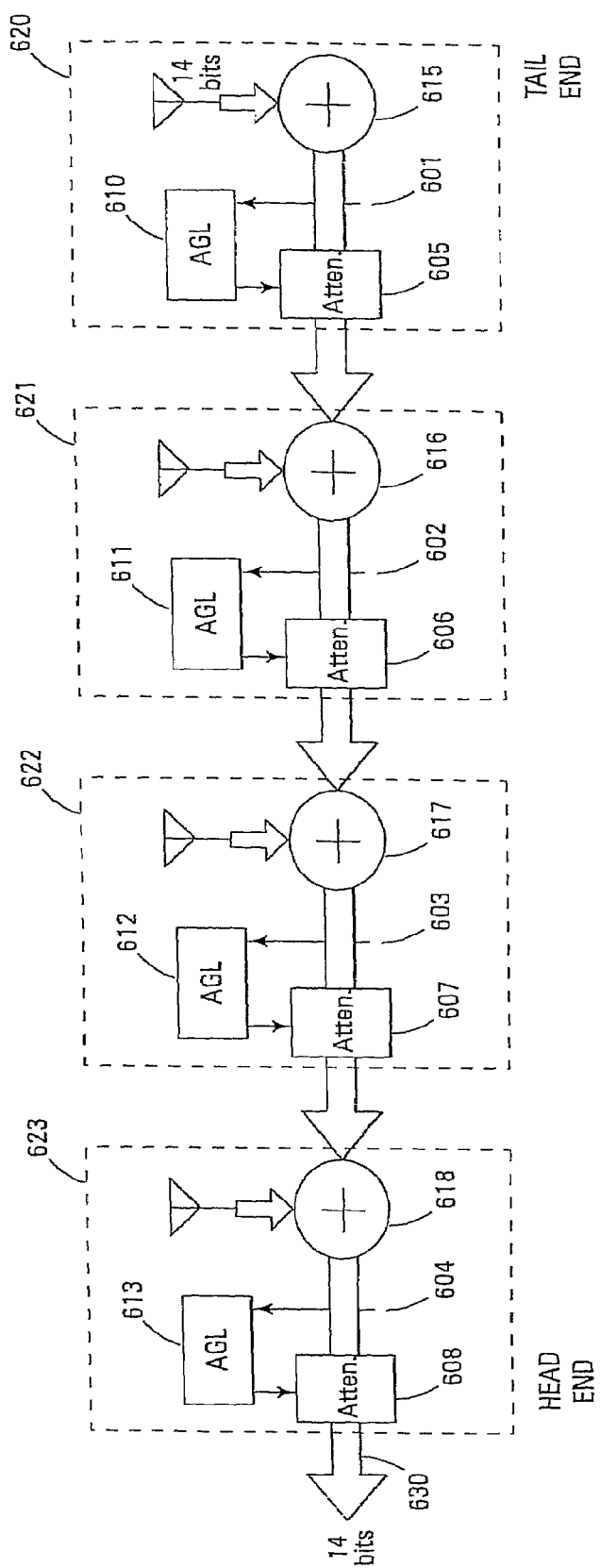
FIG. 6 shows a block diagram of one embodiment of a system having distributed summation and gain control with localized common attenuation.

FIG. 6 illustrates a block diagram of one embodiment of a system having distributed summation and gain control with localized common attenuation. This embodiment uses a standard transport path (601-604) (e.g., 14 bits) by applying localized attenuation to its aggregate signal.

Each remote unit (620-623) attenuates its common output level so that the maximum level is not exceeded. The aggregate of all summations (615-618) and attenuations (605-608) results in a head end aggregate signal (630) that does not exceed the maximum level.

The AGL function (610-613) of each remote unit (620-623) samples the common signal level output (601-604) from the respective summation (615-618). If the signal level is greater than the allowable dynamic range, the AGL function (610-613) instructs its respective output attenuation function (605-608) to attenuate that particular common signal output.

Figure 7:
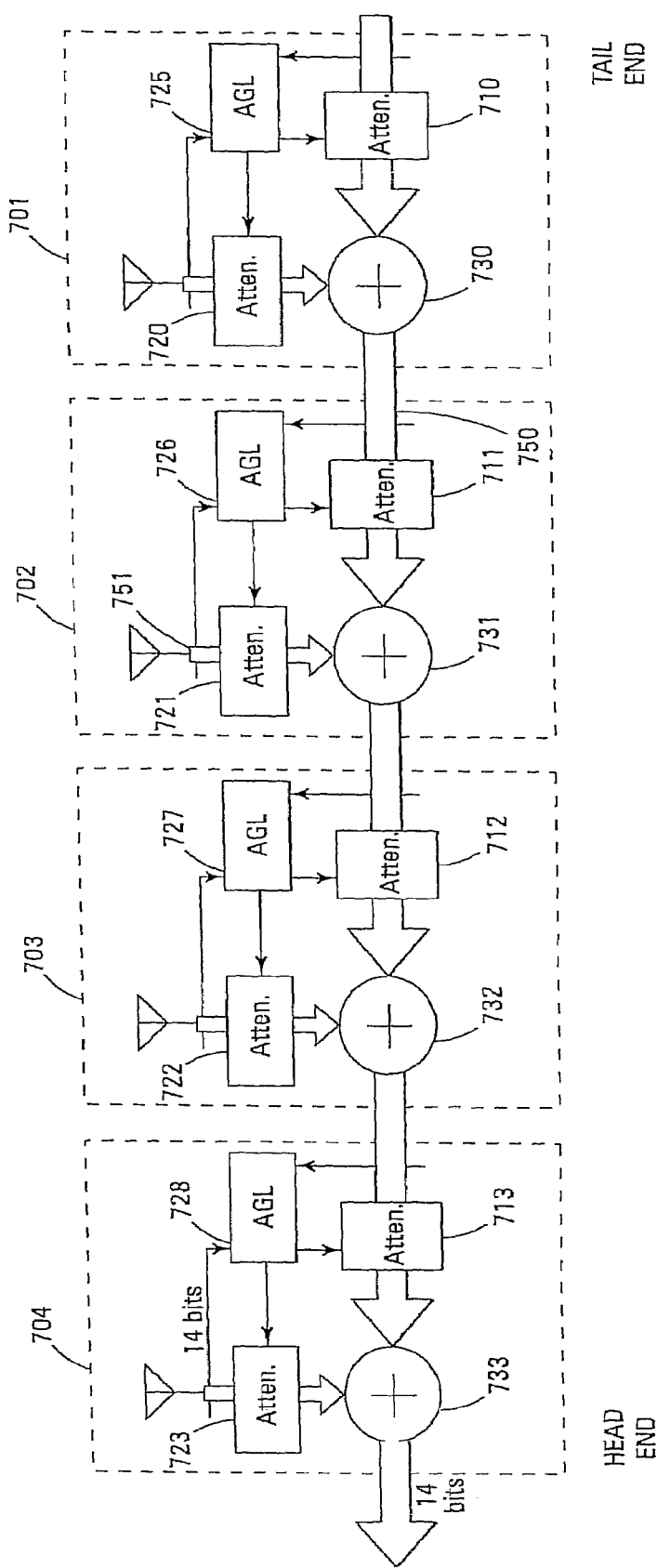
FIG. 7 shows a block diagram of one embodiment of a system having distributed summation and gain control with localized input attenuation.

FIG. 7 illustrates a block diagram of one embodiment of a system having distributed summation and gain control with localized input attenuation. In this embodiment, each of the remote units (701-704) uses an AGL function (725-728) to control attenuation functions (710-713 and 720-723) on the summation (730-733) inputs.

The input signals that are attenuated in this embodiment include both the antenna port and the downstream port. For example, in one remote unit (702) the AGL function (726) samples the downstream signal path input (750) and the antenna port input (751). If the dynamic range of either input is greater than the allowable maximum, the AGL function (726) instructs the downstream attenuation function (711), the antenna attenuation function (721), or both to attenuate the corresponding input signal.

Figure 8:
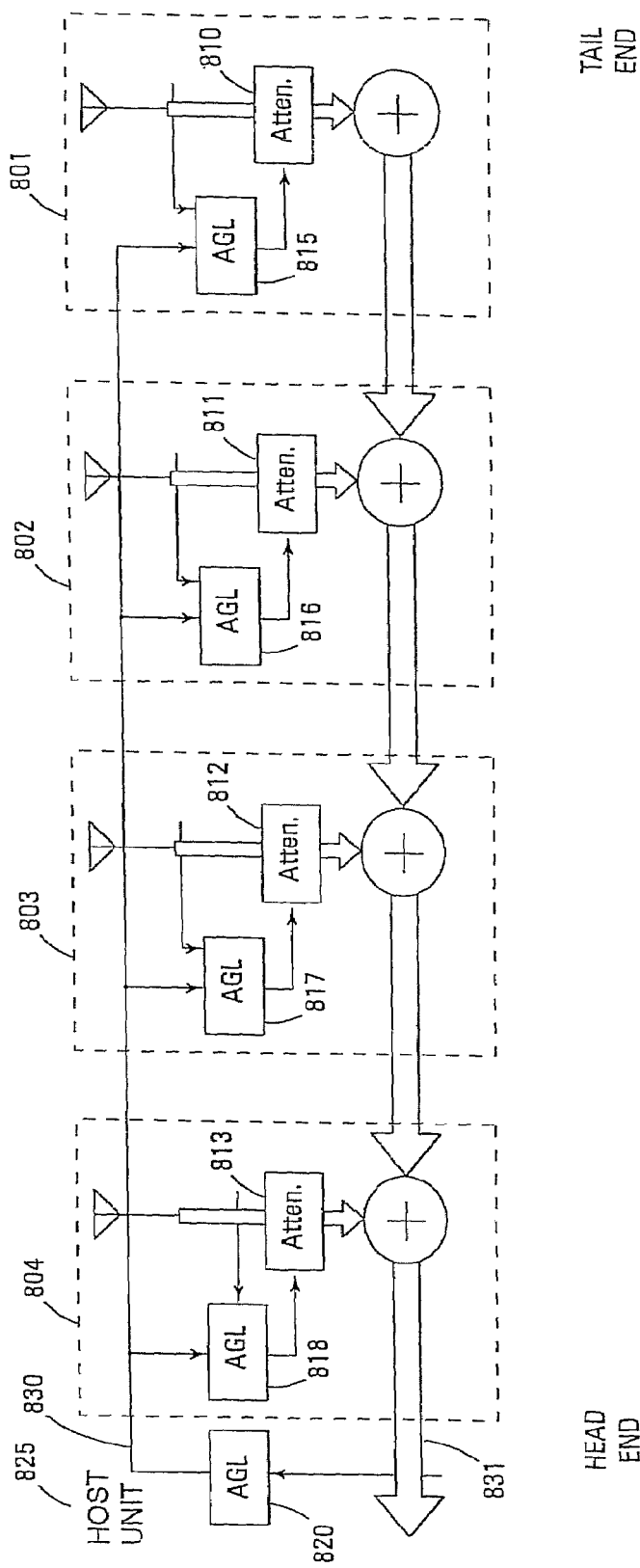
FIG. 8 shows a block diagram of one embodiment of a system having distributed summation and gain control with head end generated feedback control.

FIG. 8 illustrates a block diagram of one embodiment of a system having distributed summation and gain control with head end common attenuation. This embodiment uses an AGL function (820) at the host unit (825) to provide feedback (830) to the remote units (801-804).

Each remote unit (801-804) has an input attenuation function (810-813) at the antenna port to provide. An AGL function (815-818) samples the antenna port's received signal level. This level along with the feedback information form the head end AGL (820) is used to determine individual attenuation instructions to the input attenuation functions (810-813).

The embodiment of FIG. 8 additionally uses all AGL function (820) at the host unit (825) to sample the final aggregate signal (831). The host unit's AGL function (820) provides a head end feedback attenuation signal (830) to all of the remote units' AGL functions (815-818) to use in conjunction with the sampled input communication signal levels. One embodiment of this feedback signal (830) uses one or more bits in the data being transmitted along the optical medium to the remote units (801-804) from the host unit (825). Another embodiment uses a single bit as a communications channel to provide the feedback information.

For the case of continuous attenuation, the feedback attenuation signal (830) is a head end continuous attenuation factor. In one embodiment this factor is comprised of a value between 0 and 1. The localized AGL (815-818) uses this factor in addition to the local input signal level to determine what attenuation, if any, to apply locally. In one embodiment the continuous attenuation is accomplished by multiplication.

For the case of stepped attenuation, the feedback attenuation signal (830) is a head end stepped attenuation factor. In one embodiment this factor is comprised of an integer value between 0 and 5. The localized AGL (815-818) uses this factor in addition to the local input signal level to determine what stepped attenuation, if any, to apply locally. In one embodiment the stepped attenuation is accomplished by bit shifting.

Since some of the signals may not be attenuated, the resulting aggregate signal may still be slightly too high. In this case, the AGL function (820) at the host unit (825) adjusts its feedback attenuation factor to whatever value is needed (e.g., 0.4 in a continuous feedback system ranging from 0 to 1). This value is dynamic and is lowered until the desired aggregate signal level is achieved.

Using the continuous attenuation method, the host unit's AGL function (820) samples the final aggregate signal (831) from the remote unit (804) nearest the head end. If the level of the final aggregate signal (831) is too large, the host unit (825) provides a feedback attenuation factor that starts at one and slews down toward zero. When the final aggregate signal level is within bounds (i.e., less than the maximum dynamic range), the host unit holds this attenuation factor.

If the final aggregate signal level later decreases sufficiently, the host unit (825) slowly raises the attenuation factor back toward one. All of the remote units (801-804) apply attenuation only to their own ports. This applied attenuation depends on the respective antenna port's input level as well as the feedback factor (830).

Using the stepped attenuation method, the host unit (825) samples the final aggregate signal (831) from the remote unit (804) nearest the head end. If the final aggregate signal (831) is too large, the host unit (825) provides a feedback number. In one embodiment, this is a number that starts at 0 (no attenuation) and increments towards 5 (maximum attenuation). This embodiment assumes 6 dB per step and accommodates 30 db attenuation. Other embodiments use other increments and other ranges.

When the final aggregate signal level is less than or equal to 0 dB (unity gain), the host unit's AGL function (820) holds this feedback number. If the final aggregate signal level decreases to a predetermined level (e.g., −12 dB), the host unit decrements the feedback number back towards 0. The decrementing occurs after a delay due to system end-to-end response.

Figure 9:
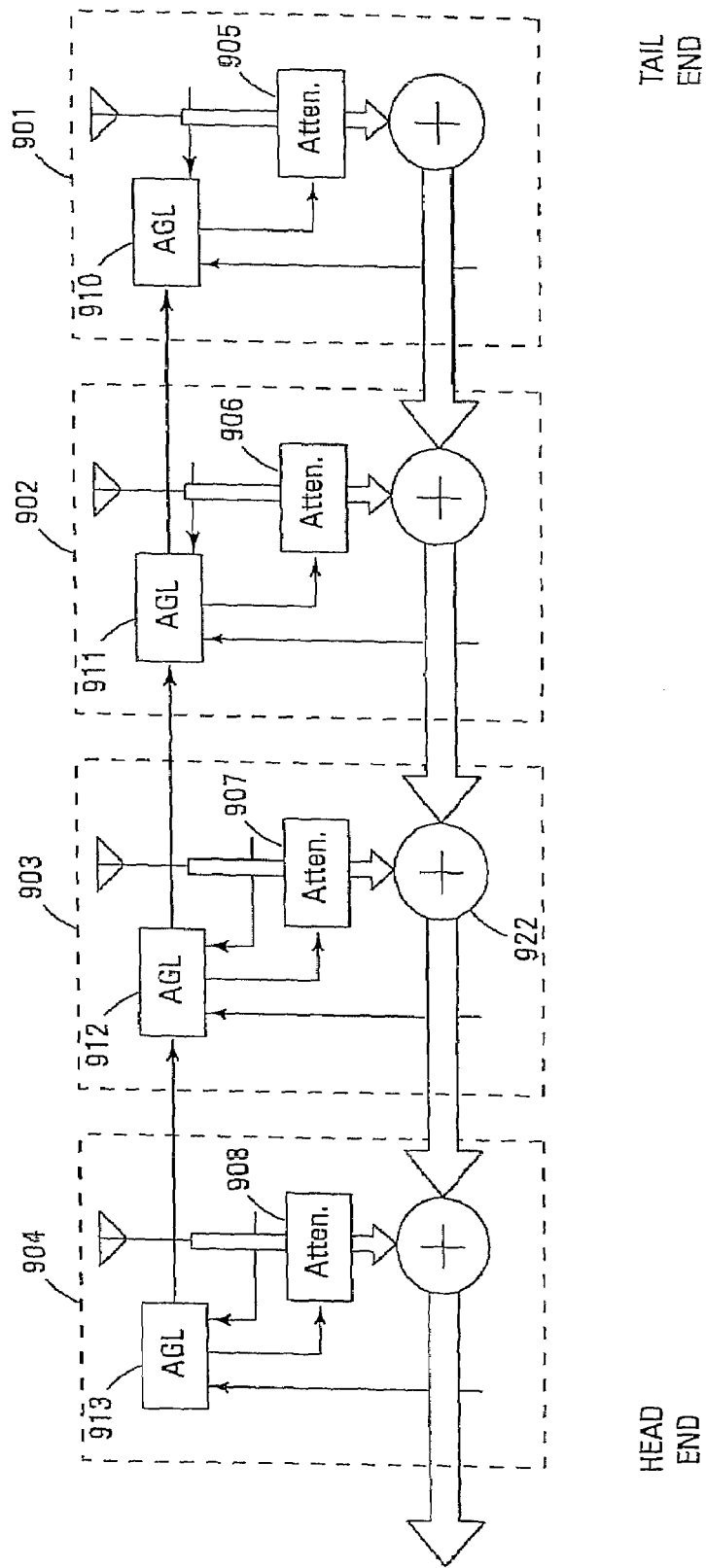
FIG. 9 shows a block diagram of one embodiment of a system having distributed summation and gain control with distributed feedback control.

FIG. 9 illustrates a block diagram of one embodiment of a system having distributed summation, distributed attenuation, and distributed attenuation control. In this embodiment each remote unit (901-904) re-computes the AGL feedback factor for downstream units.

In this embodiment, every unit (901-904) is functionally identical with the same AGL function (910-913). The AGL function has both an input feedback factor (from the direction of the head end), a signal from the sampled antenna input, and an input from the common output. At the head end unit (904), the input feedback is unconnected.

Each AGL function (910-913) has two outputs. One output is used to control the attenuation (905-908) of the antenna signal input. The other output is used to provide an output feedback factor in the direction of the tail end. At the tail end (901) the output feedback is unconnected.

The AGL function (910-913) determines a factor related to the common input signal. The output feedback factor is based on both this common factor and the input feedback factor. In one embodiment, the most severe factor is used.

The AGL function (910-913) also determines amount of input attenuation (905-908) to the antenna signal. This attenuation is based on the input feedback factor, the input antenna signal level, and the common input signal level.

In this embodiment, the host unit generates the highest attenuation factor because its aggregate signal is the largest. Because of the feedback, all units normally use this factor to apply attenuation. Since all of the remote units also sample their own antenna port, in one embodiment they will apply no attenuation or little attenuation to sufficiently small signals and apply large attenuation to large signals. That is, the gain is inversely proportional to the large signal level.

If there is a break in the feedback path, the aggregate sampling at each remote unit prevents any unit's aggregate signal from overflowing. Furthermore, all units from the tail end to the point of the break will perform fair sharing of the aggregate signals amongst themselves. Similarly, all units from the break to the head end will perform fair sharing of the aggregate signals amongst themselves. However, the tail end group is favored over the head end group.

Numerous modifications and variations of the present invention are possible in light of the above teachings. It is therefore to be understood that within the scope of the appended claims, the invention may be practiced otherwise than as specifically described herein.

What is claimed is:

1. An apparatus for gain control in a communication system, the apparatus comprising:
   means for receiving at least one aggregate, upstream communications signal, the at least one aggregate, upstream communications signal comprising a summation of distributed communications signals;
   means for detecting at least a sample of a signal level of the at least one aggregate, upstream communications signal; and
   means for attenuating the signal level of the at least one aggregate, upstream communications signal based on the signal level sample.

2. The apparatus of claim 1, wherein the means for receiving the at least one aggregate, upstream communications signal further include means for summing a plurality of received signals in a distributed, daisy-chain fashion with any prior-summed signals from a downstream antenna port of a plurality of antenna ports within the communication system.

3. The apparatus of claim 1, wherein the means for receiving the at least one aggregate, upstream communications signal further include means for converting the summation of distributed communications signals to one or more digital signals such that the at least one aggregate, upstream communications signal is a digital signal represented by a predetermined quantity of bits.

4. The apparatus of claim 1, wherein the means for detecting the signal level sample of the at least one aggregate, upstream communications signal include means for generating attenuation instructions based on the signal level sample of the at least one aggregate, upstream communications signal.

5. The apparatus of claim 4, wherein the means for generating the attenuation instructions based on the signal level sample further include an automatic gain limiting function that generates an attenuation number, the attenuation number indicating a quantity of discrete attenuation increments to attenuate the at least one aggregate, upstream communications signal.

6. The apparatus of claim 1, wherein the means for attenuating the signal level of the at least one aggregate, upstream communications signal include means for reducing a predetermined quantity of bits necessary to represent the at least one aggregate, upstream communications signal.

7. A circuit for gain control in a communication system, the circuit comprising:
   means for receiving at least one aggregate, upstream communications signal, the at least one aggregate, upstream communications signal comprising a summation of distributed communications signals;
   means, responsive to the means for receiving, for detecting a signal level of the at least one aggregate, upstream communications signal;
   means, responsive to the means for detecting and the means for receiving, for generating attenuation instructions based on the signal level of the at least one aggregate, upstream communications signal; and
   means, responsive to the means for generating, for attenuating the signal level of the at least one aggregate, upstream communications signal.

8. The circuit of claim 7, and further comprising means, associated with the means for receiving, for converting the received signal to a digital format.

9. The circuit of claim 8, wherein the means for converting include a plurality of converters.

10. The circuit of claim 7, wherein the means for receiving and the means for receiving and the means for detecting include a communications medium coupling the plurality of distributed antenna ports.

11. The circuit of claim 7, wherein the means for generating and the means for attenuating include a host unit.

12. The circuit of claim 11, wherein the means for generating include a gain control function within the host unit.

13. The circuit of claim 11, wherein the means for attenuating include an attenuation function within the host unit.

14. The circuit of claim 7, wherein the means for generating include an automatic gain limiting function.

15. A program product comprising program instructions, embodied on a storage medium, the program product operable to cause at least one programmable processor included in one or more controllers within a communication system, the system having gain control for signals from distributed antennas, to:
   receive a plurality of communications signals, the plurality of communications signals comprising a summation of prior-summed communications signals from at least one of a plurality of downstream antenna ports in a daisy chain distribution, with one of the plurality of communications signals being a final aggregate, upstream signal;
   detect at least a sample of a signal level of the final aggregate, upstream signal;
   generate a feedback attenuation signal based on the detected sample;
   generate attenuation instructions based on the feedback attenuation signal; and
   attenuate each of the plurality of communications signals in response to the signal levels of the final aggregate, upstream signal and the feedback attenuation signal.

16. The program product of claim 15, wherein the program instructions that attenuate each of the plurality of communications signals cause the at least one programmable processor to multiply the signal levels of the final aggregate, upstream signal and the feedback attenuation signal by an attenuation factor from an automatic gain limiting function.

17. The program product of claim 16, wherein the program instructions that multiply the signal levels of the final aggregate, upstream signal and the feedback attenuation signal cause the at least one programmable processor to generate an attenuation number that indicates a quantity of discrete attenuation increments to attenuate each of the plurality of communications signals.

18. The program product of claim 15, wherein the program instructions that attenuate each of the plurality of communications signals cause the at least one programmable processor to attenuate once a first signal level is at least equal to 1/N of a total system dynamic range, where N is a quantity of the downstream antenna ports.

19. The program product of claim 15, further comprising program instructions operable to cause the at least one programmable processor to set the feedback attenuation signal to a feedback attenuation number if the signal level of the final aggregate, upstream signal is greater than a total dynamic range of the communication system.

20. The program product of claim 19, wherein the program instructions that set the feedback attenuation signal to a feedback attenuation number cause the at least one programmable processor to:
increment the feedback attenuation number until the signal level of the final aggregate, upstream signal is less than or equal to a first predetermined threshold; and decrement the feedback attenuation number towards zero when the signal level of the final aggregate, upstream signal decreases to a second predetermined threshold.

21. A method for operating a communication system having gain control for signals from distributed antennas, the method comprising:
receiving a plurality of communications signals at one or more controllers within a communication system having gain control for signals from distributed antennas, the plurality of communications signals comprising a summation of prior-summed communications signals from at least one of a plurality of downstream antenna ports in a daisy chain distribution, with one of the plurality of communications signals being a final aggregate, upstream signal;
detecting at least a sample of a signal level of the final aggregate, upstream signal;
generating a feedback attenuation signal based on the detected sample;
generating attenuation instructions based on the feedback attenuation signal; and
attenuating each of the plurality of communications signals in response to the signal levels of the final aggregate, upstream signal and the feedback attenuation signal.

22. The method of claim 21, wherein attenuating each of the plurality of communications signals comprises multiplying the signal levels of the final aggregate, upstream signal and the feedback attenuation signal by an attenuation factor from an automatic gain limiting function.

23. The method of claim 22, wherein multiplying the signal levels of the final aggregate, upstream signal and the feedback attenuation signal comprises generating an attenuation number that indicates a quantity of discrete attenuation increments to attenuate each of the plurality of communications signals.

24. The method of claim 21, wherein attenuating each of the plurality of communications signals comprises attenuating each of the plurality of communications signals once a first signal level is at least equal to 1/N of a total system dynamic range, where N is a quantity of the downstream antenna ports.

25. The method of claim 21, further comprising setting the feedback attenuation signal to a feedback attenuation number if the signal level of the final aggregate, upstream signal is greater than a total dynamic range of the communication system.

26. The method of claim 25, wherein setting the feedback attenuation signal to the feedback attenuation number comprises:
incrementing the feedback attenuation number until the signal level of the final aggregate, upstream signal is less than or equal to a first predetermined threshold; and
decrementing the feedback attenuation number towards zero when the signal level of the final aggregate, upstream signal decreases to a second predetermined threshold.

* * * * *

UNITED STATES PATENT AND TRADEMARK OFFICE
CERTIFICATE OF CORRECTION

PATENT NO. : 7,546,138 B2  Page 1 of 1
APPLICATION NO. : 11/624541
DATED : June 9, 2009
INVENTOR(S) : Bauman It is certified that error appears in the above-identified patent and that said Letters Patent is hereby corrected as shown below:

On the title page, item [56]:

On page 2 include the following references:

Under U.S. Publication Applications:

-- 2003/143947    7/2003    Lyu --

-- 2003/162516    8/2003    Solum --

Under Foreign Patent Documents:

-- EP    0368673 A1    05/1990 --

-- FR    2345865    10/1977 --

Signed and Sealed this

Fifth Day of January, 2010

David J. Kappos
*Director of the United States Patent and Trademark Office*